D. BROWN.
VALVE.
APPLICATION FILED MAY 19, 1917.
1,260,138.
Patented Mar. 19, 1918.
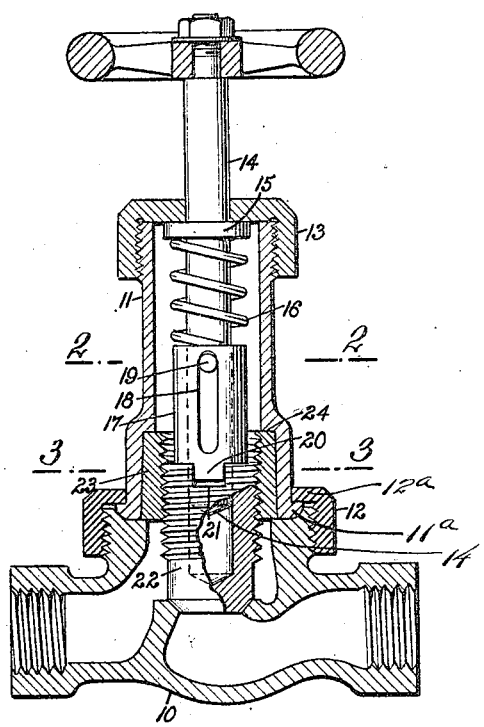
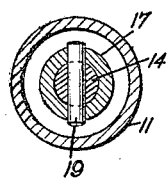
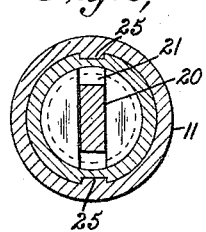
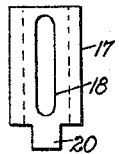
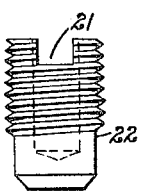
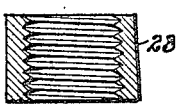
WITNESSES
INVENTOR
Dennis Brown
BY
ATTORNEYS

UNITED STATES PATENT OFFICE.

DENNIS BROWN, OF SAN BERNARDINO, CALIFORNIA.

VALVE.

1,260,138.  Specification of Letters Patent.  Patented Mar. 19, 1918.

Application filed May 19, 1917. Serial No. 169,689.

*To all whom it may concern:*

Be it known that I, DENNIS BROWN, a citizen of the United States, and resident of San Bernardino, in the county of San Bernardino and State of California, have invented a new and Improved Valve, of which the following is a full, clear, and exact description.

The invention is adapted to be embodied in various valves comprising a valve body, a stem, and a valve adapted to be seated or unseated by the turning of the stem in the body. More particularly the invention relates to a self-packing valve.

An object of the invention is to provide a valve of the indicated character improved in various particulars, whereby to prevent leakage around the valve stem without special packing and at the same time insure a positive operation of the valve in response to the turning of the stem.

A further object of the invention is to provide a construction involving parts of simple form adapted to be readily assembled or disassembled.

The invention will be particularly explained in the specific description following.

Reference is to be had to the accompanying drawings forming a part of this specification in which similar reference characters indicate corresponding parts in all the views.

Figure 1 is a sectional side elevation of a valve embodying my invention;

Fig. 2 is a horizontal section on the line 2—2, Fig. 1;

Fig. 3 is a horizontal section on the line 3—3, Fig. 1;

Fig. 4 is a side elevation of a sleeve through the medium of which the valve proper is seated or unseated;

Fig. 5 is a side elevation of the valve proper;

Fig. 6 is a vertical section of the fixed valve nut.

The invention is shown as embodied in a globe valve, the numeral 10 indicating the valve body; 11, the bonnet; 12, the union or nut securing the bonnet to the body; and 13, the cap nut of the bonnet through which the valve stem 14 extends.

The bonnet 11 has an outwardly disposed flange 11ª at its lower end seating on the top of the body 10 and the nut 12 has an inturned flange 12ª acting to clamp the said bonnet flange onto the body.

In carrying out my invention I form or secure to the stem 14 a collar or flange 15 which is adapted to seat against the inner side of the cap 13, a ground joint being produced in practice. To hold the collar 15 against the cap 13 a spiral spring 16 is coiled about the valve stem and bears at one end against said collar. The opposite end of the spring 16 exerts its pressure against a sleeve 17 loose on the stem 14.

In order to permit the sleeve 17 to slide on the stem and at the same time prevent its turning, a slot and pin connection is provided, there being a longitudinal slot 18 in the said sleeve and a fixed pin 19 on the stem extending into said slot. The inner end of the sleeve 17 is formed with a projection 20 which is received in a recess 21 in the valve proper 22. Thus, the turning of the stem 14 will turn the sleeve 17 and the latter will turn the valve 22. The valve 22 has external threads engaging the threads of the fixed valve nut 23 so that the turning of the valve in either direction will cause it to seat or unseat. The nut 23 is held against turning and against sliding movement by being clamped between the valve body 10 adjacent to the union 12 and a shoulder 24 on the bonnet 11. Also, I provide mating ribs and grooves in the bonnet 11 and the valve nut 23 as indicated at 25 in Fig. 3.

With the described arrangement the spring 16, it will be observed, serves the two-fold purpose of holding the collar 15 tightly against the cap nut 13, thereby making the packing unnecessary, and at the same time the spring holds the sleeve 17 in turning engagement with the valve 22, the slot and pin connection between the stem and sleeve permitting the movement of the valve and sleeve.

Having thus described my invention I claim as new, and desire to secure by Letters Patent:

1. A valve including a valve body having a seat, a bonnet on the said valve, said bonnet having a cap and having an outwardly disposed flange on the lower end, a nut threaded on the body and formed with an inturned flange engaging and clamping the flange of the bonnet, a valve arranged for movement to and from said seat and having external threads, a valve nut separate from the body and bonnet and engaged by the threads of the said valve, the said valve nut being seated on the valve body and the bonnet having an internal shoulder engaging the valve nut at the top and clamping the same onto the body, a stem extending through the cap and formed with a collar at the inner side of the cap, said stem being separate from the said valve, a sleeve loose on the stem to slide thereon, the sleeve having a longitudinal slot therein and the said stem having a pin extending into said slot, and a spring on the stem and bearing at its ends respectively against the collar on the stem and against the adjacent end of the said sleeve, the sleeve and valve having respectively a mating projection and a recess.

2. In a valve of the class described, a body having a valve seat, a valve arranged to move to and from said seat and having external threads, a nut separate from the body engaging the threads of the said valve, a flanged bonnet, a nut clamping the flange of the bonnet onto the valve body, the said bonnet having a shoulder, and the first mentioned nut being clamped between the said shoulder and the top of the body within the bonnet, the said bonnet and body, housing the valve and nut, a cap nut on the bonnet, a stem extending through the cap nut and separate from the said valve, a sleeve on the stem and engaging the said valve to turn the same, and a spring exerting its pressure at one end against the stem and at the opposite end against said sleeve, the sleeve being longitudinally movable on the stem and held against turning movement relatively to the stem.

DENNIS BROWN.

Copies of this patent may be obtained for five cents each, by addressing the "Commissioner of Patents, Washington, D. C."